United States Patent [19]
Cozzani

[11] Patent Number: 5,267,667
[45] Date of Patent: Dec. 7, 1993

[54] PLUG ADAPTED TO BE FIXED BY MEANS OF HOT MELT ADHESIVE INTO AN OPENING IN A PLATE SUCH AS AN AUTOMOBILE BODY

[75] Inventor: Henri Cozzani, Conflans Ste Honorine, France

[73] Assignee: ITW De France, Beauchamp, France

[21] Appl. No.: 953,674

[22] Filed: Sep. 30, 1992

[30] Foreign Application Priority Data

Oct. 4, 1991 [FR] France .................. 91 12248

[51] Int. Cl.$^5$ ............... B65D 39/04; B65D 45/16
[52] U.S. Cl. .................. 220/307; 220/308; 220/359; 220/326; 220/302; 220/293; 220/DIG. 19; 215/232; 215/355
[58] Field of Search ....... 220/307, 308, 359, DIG. 19, 220/326, 302, 293, 297; 215/232, 355, 359, 363, 332, 356

[56] References Cited

U.S. PATENT DOCUMENTS

| | | | |
|---|---|---|---|
| 3,018,535 | 1/1962 | Griffin | 220/326 X |
| 4,091,962 | 5/1978 | van Buren, Jr. | 220/326 |
| 4,363,420 | 12/1982 | Andrews | |
| 4,504,009 | 3/1985 | Boik et al. | 220/307 X |
| 4,572,390 | 2/1986 | Grittmann | 220/307 X |
| 4,588,105 | 5/1986 | Schmitz et al. | 220/359 |
| 4,760,935 | 8/1988 | van den Beld et al. | 220/307 |
| 4,761,319 | 8/1988 | Kraus et al. | 220/307 X |
| 4,784,285 | 11/1988 | Patel | 220/307 |
| 4,801,040 | 1/1989 | Kraus | 220/307 |
| 4,883,194 | 11/1989 | Fernandes | 220/307 |
| 5,069,357 | 12/1991 | Anderson | 220/307 |

FOREIGN PATENT DOCUMENTS

| | | |
|---|---|---|
| 0234032 | 9/1987 | European Pat. Off. |
| 3427626 | 10/1985 | Fed. Rep. of Germany |
| 2167515 | 5/1986 | United Kingdom |

*Primary Examiner*—Allan N. Shoap
*Assistant Examiner*—Vanessa Caretto
*Attorney, Agent, or Firm*—Schwartz & Weinrieb

[57] ABSTRACT

A plug is adapted to be fixed by means of a hot melt adhesive into an opening in a plate. It comprises a molded plastics material body and a bead of hot melt adhesive deposited onto a peripheral surface of the body around a surface transverse to the peripheral surface. The body comprises at least one snap-fastener blade having an insertion ramp and a retaining lip such that the insertion ramp bears against the edge of the opening when the plug is placed on the latter, bends if pressure is then applied to the plug to press it into the opening, and expands thereafter with the lip facing a first side of the plate while the bead of adhesive faces a second side of the plate. The snap-fastener blade extends between an attachment end and a free end in a longitudinal direction parallel to the peripheral surface and to the transverse surface. The blade is therefore entirely on the second side of the plate when the plug is snap-fastened in place. The distance in the longitudinal direction between the attachment end and the free end is greater than the distance between the peripheral surface and the foot of the insertion ramp.

20 Claims, 2 Drawing Sheets

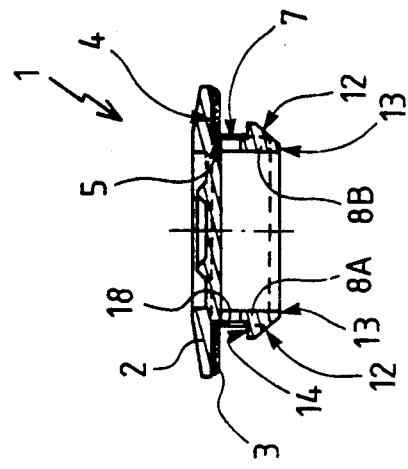
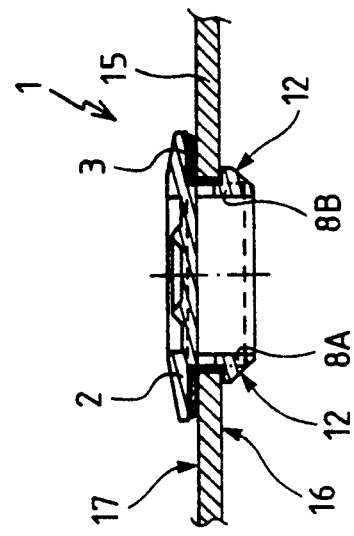
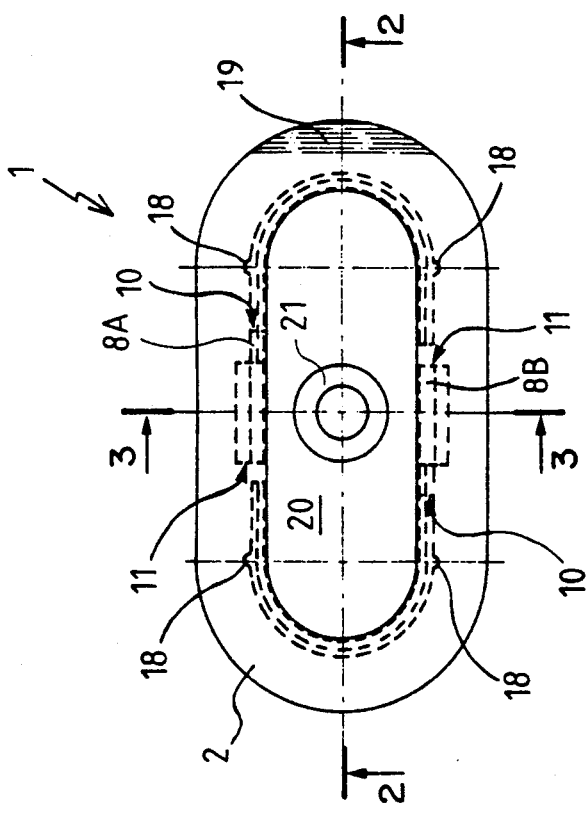
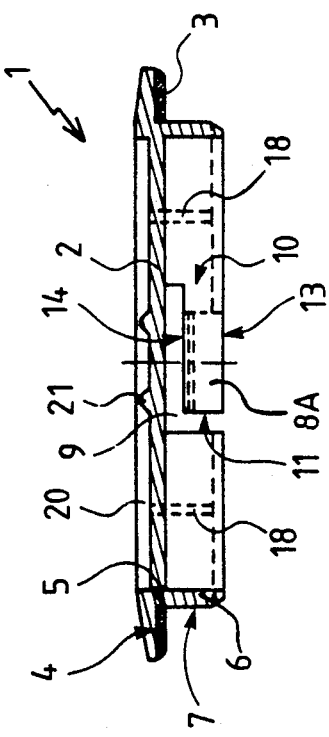

PLUG ADAPTED TO BE FIXED BY MEANS OF HOT MELT ADHESIVE INTO AN OPENING IN A PLATE SUCH AS AN AUTOMOBILE BODY

BACKGROUND OF THE INVENTION

1. Field of the invention

The invention concerns a plug adapted to be fixed by means of a hot melt adhesive into an opening in a plate such as an automobile body in order to seal the opening.

2. Description of the prior art

A known plug of this kind comprises a molded plastics material body and a bead of HOT MELT adhesive deposited on a peripheral surface of the body around a surface transverse to the peripheral surface. The body has a generally circular shape and comprises three similar snap-fastener blades each extending between an attachment end and a free end in an axial direction perpendicular to the peripheral surface and parallel to the transverse surface. The attachment end is at the same level as the peripheral surface, the transverse surface being interrupted at the locations of the blades. An insertion ramp is provided between the free end and a retaining lip, the snap-fastener blades being adapted so that the insertion ramp bears against the edge of the opening when the plug is placed thereon, to bend if pressure is applied to the plug to force it into the opening and to expand subsequently with the retaining lip facing a first side of the plate and the bead of adhesive facing a second side of the plate.

The snap-fastener blades provide temporary retention, permanent retention being provided by the hot melt adhesive: the plate is adapted to be heated, for example to set paint recently applied to it, whereupon the adhesive melts and when it has cooled the plug is welded to the plate, the opening being sealed.

The openings for which the plug is intended are usually stamped into the plate and therefore are subject to significant variations in size so that it may not be possible to force the plug into the opening or the blades may not be able retain it there.

The invention is directed to overcoming these drawbacks.

SUMMARY OF THE INVENTION

The present invention consists in a plug adapted to be fixed by means of a hot melt adhesive into an opening in a plate, comprising a molded plastics material body and a bead of hot melt adhesive deposited onto a peripheral surface of said body around a surface transverse to said peripheral surface, said body comprising at least one snap-fastener blade having an insertion ramp and a retaining lip such that the insertion ramp bears against the edge of the opening when the plug is placed on the latter, bends if pressure is then applied to the plug to press it into the opening, and expands thereafter with the lip facing a first side of the plate while the bead of adhesive faces a second side of the plate, said snap-fastener blade extending between an attachment end and a free end in a longitudinal direction parallel to said peripheral surface and to said transverse surface so that said blade is entirely on said second side of said plate when said plug is snap-fastened in place and the distance in said longitudinal direction between said attachment end and said free end is greater than the distance between said peripheral surface and the foot of said insertion ramp.

Being so disposed, the snap-fastener blade is entirely free, unlike the prior art plug in which it was often in contact with the adhesive surrounding it, in its portion near the peripheral surface, which impeded it bending, especially outwards.

Also, its length being greater than that of the anterior blade, it is much more flexible and can therefore compensate large variations in the dimensions of the opening and even enable snap-fastening of the plug from the side opposite that from which the hole was punched, despite the burrs produced by punching which then face towards it.

Note that this increase in flexibility is achieved with the same overall axial dimension because in the prior art plug the blade extends from the peripheral surface (attachment end) to the foot of the insertion ramp (free end).

An advantageous feature of the invention is that said transverse surface is uninterrupted.

This confers upon the plug excellent resistance to the force to which it is subjected during snap-fastening, unlike the prior art plug which is interrupted at the location of the snap-fastener blade.

In a first preferred embodiment the plug has a wall whose outside surface extends said transverse surface and the snap-fastener blade is formed in said wall by an L-shape opening.

In a second preferred embodiment the plug has an axial lug projecting from a shank whose outside surface is said transverse surface, the snap-fastener blade being joined by its attachment end to one side of this lug.

BRIEF DESCRIPTION OF THE DRAWINGS

The explanation of the invention will now continue with a description of two embodiments by way of non-limiting and purely illustrative example with reference to the appended drawings, wherein like reference characters designate like or corresponding parts throughout the several views, and wherein:

FIG. 1 is a top view of a first embodiment of a plug in accordance with the invention.

FIGS. 2 and 3 are views in cross-section on the respective lines 2—2 and 3—3 in FIG. 1.

FIG. 4 is a view similar to FIG. 3 showing the plug snapped into place.

DETAILED DESCRIPTION OF THE INVENTION

Figure 5:
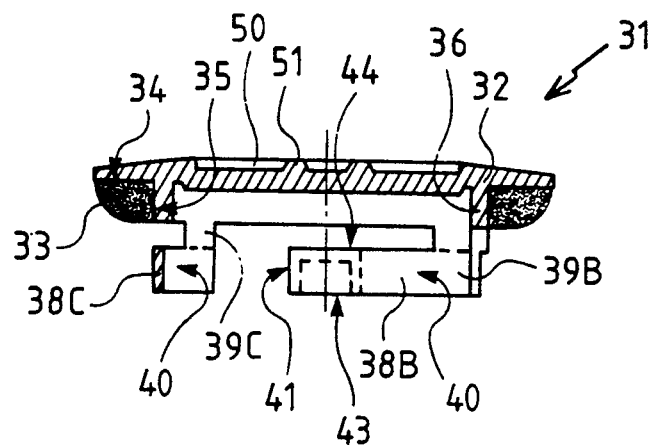
FIG. 5 is a view in elevation of a second embodiment of a plug in accordance with the invention in cross-section on the line 5—5 in FIG. 6.

The plug 1 shown in FIGS. 1 through 4 is designed to fit an oblong opening whose general shape it adopts.

It comprises a molded plastics material body 2 and a bead 3 of HOT MELT adhesive deposited on an annular, flanged peripheral surface 4 of the body around an uninterrupted surface 5 transverse to the peripheral surface. An axial wall 6 has an outside surface 7 extending the transverse surface 5 at the end opposite the peripheral surface 4 and a snap-fastener blade 8A or 8B is formed in each rectilinear section of the wall 6 by an L-shape opening 9.

It can be seen that the blades 8A and 8B are similar, that each extends, in effect, in a cantilevered manner between an attachment end 10 and a free end 11 in a longitudinal direction parallel to the peripheral surface 4 and to the transverse surface 5, that each has an insertion ramp 12 inclined from its foot 13 to a retaining lip 14 and that the distance along the blade between the ends 10 and 11 is greater than the distance between the peripheral surface 4 and the foot 13 of the insertion ramp.

To insert the plug into an oblong opening formed in a plate 15 the plug is offered up to the opening with the insertion ramps 12 at the front, the ramps bear against the edge of the opening, the blades 8A and 8B bend if pressure is applied to the plug to force it into the opening and at the end of insertion they expand with the retaining lip 14 facing a first side 16 of the plate 15, the blades being entirely on the same side of the plate, the bead of adhesive 3 facing a second side 17 of the plate. The position is then as shown in FIG. 4.

Figure 6:
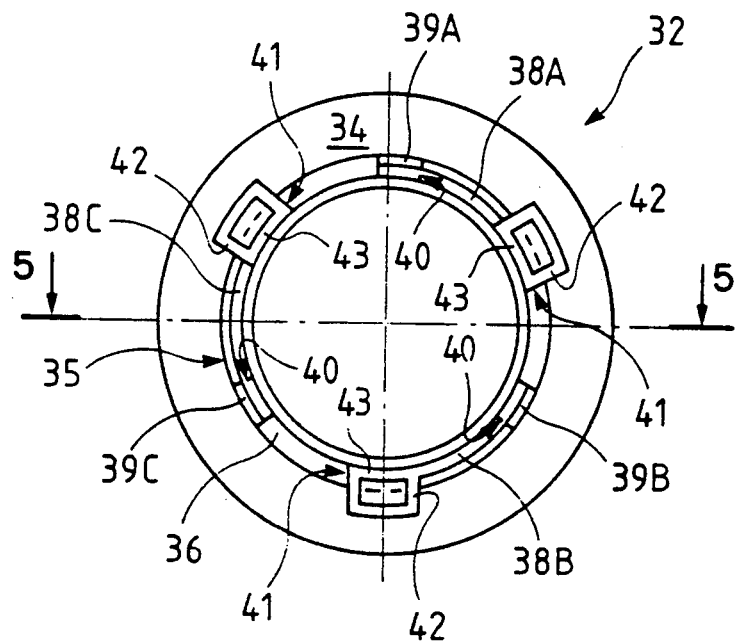
FIG. 6 is a bottom view of the body of this plug.

The plug 31 shown in FIGS. 5 and 6 is designed for a circular opening whose general shape it adopts.

It comprises a molded plastics material body 32 and a bead 33 of HOT MELT adhesive deposited on a peripheral surface 34 of the body around an uninterrupted surface 35 transverse to the peripheral surface 34.

The transverse surface 35 is the outside surface of a shank formed in this embodiment by a circular wall 36 and projecting from this shank the body 32 comprises three lugs 39A, 39B and 39C to one side of each of which a snap-fastener blade 38A, 38B or 38C is attached at an attachment end 40.

It can be seen that the blades 38A, 38B and 38C are similar, that each extends, in effect in a cantilevered manner between an attachment end 40 and a free end 41 in a longitudinal direction parallel to the peripheral surface 34 and to the transverse surface 35, that each has an insertion ramp 42 which is inclined from its foot 43 to a retaining lip 44 and that the distance along the blade between the ends 40 and 41 is greater than the distance between the peripheral surface 34 and the foot 43 of the insertion ramp.

The plug 31 is inserted into an opening in a similar way to the plug 1.

Note that the plug 1 comprises four localized areas of increased thickness 18, here of elongate configuration and oriented axially, adapted to bear against the edge of the opening in the plate 15 when the plug is fitted into the latter, which complements the snap-fastening by a grip-fastening. The plug 31 does not comprise any such increased thickness, but could do so as an alternative, in particular on the outside surface of the lugs 39A, 39B and 39C.

The plug 1 has on the surface 4 striations 19 (partially shown in FIG. 1) to favor the adhesion of the adhesive. The surface 34 of the plugs 31 also has such striations (not shown).

A respective central depression 20 and 50 is provided in the top surface of the plugs 1 and 31 and a respective circular bead 21 and 51 is formed there to enable manipulation of the plug by an automatic device which cooperates with the circular bead.

In each of the plugs 1 and 31 the snap-fastener blades 8A, 8B or 38A, 38B, 38C comprise a projecting increased thickness portion to form the insertion ramp 12 or 42 and the retaining lip 14 or 44. In these embodiments this increased thickness portion is wedge-shaped at the end of the lug but as an alternative to this different shapes can be used, and in particular some degree of progressiveness of projection between the attachment end and the free end, in order to increase the flexibility on inserting the plug into the opening.

In alternative embodiments that are not shown the mode of construction of the plug 1 (wall 6 and cut-out 9 to form the snap-fastener blades) is adopted for circular openings and the mode of construction of the plug 31 (lugs projecting from a shank to one side of which the respective blades are attached) for oblong openings.

The number of snap-fastener blades depends on the specific application, the blades being preferably equiangularly distributed in circular embodiments.

Note that the plug can have a shape other than oblong or circular, and more generally it should be noted that the invention is not limited to the embodiments described.

There is claimed:

1. A plug to be fixedly inserted within an opening of a plate, comprising:
    a body portion having an annular, flanged peripheral portion defined about said body portion so as to extend in a circumferential direction about said body portion;
    hot melt adhesive means disposed upon an undersurface portion of said annular, flanged peripheral portion of said body portion for engaging a first surface of said late when said plug is inserted within said opening of said plate; and
    at least one snap-fastener blade means for snap-engaging a second surface of said plate when said plug is inserted within said opening of said plate, said at least one snap-fastener blade means being flexibly secured to said body portion in a cantilevered manner by means of an attachment end fixed to said body portion at a first peripheral location in said circumferential direction, and having a free end portion thereof extending in a longitudinal direction of said blade means which is disposed parallel to said annular, flanged peripheral portion and which is located at a second peripheral location which is remote from said first peripheral location along said circumferential direction.

2. A plug as set forth in claim 1, wherein:
    said body portion further comprises a transverse surface from which said annular, flanged peripheral portion extends radially outwardly.

3. A plug according to claim 2 wherein said transverse surface is uninterrupted.

4. A plug according to claim 2 further comprising a wall whose outside surface extends said transverse surface, said snap-fastener blade being part of said wall delimited by an L-shape cut-out.

5. A plug according to claim 2 further comprising an axial lug projecting on a shank whose exterior surface corresponds to said transverse surface, said snap-fastener blade being joined by its attachment end to one side of said lug.

6. A plug according to claim 1 further comprising at least one localized area of increased thickness adapted to bear against an edge of said opening when said plug is inserted within said opening.

7. A plug according to claim 1 of generally oblong shape and further comprising two similar snap-fastener blades each disposed on a rectilinear section.

8. A plug according to claim 1 of generally circular shape with similar snap-fastener blades equi-angularly distributed.

9. A plug according to claim 8 further comprising three similar snap-fastener blades.

10. A plug according to claim 1, further comprising:

striations disposed upon said undersurface portion of said peripheral portion for enhancing the adherence of said adhesive means thereto.

11. The plug as set forth in claim 1, wherein:
said plug body portion is fabricated from a molded plastic material.

12. The plug as set forth in claim 1, wherein:
said snap-fastener blade means comprise an insertion ramp for engaging an edge portion of said opening in order to facilitate insertion of said plug within said opening of said plate, and a retaining lip for engaging said second surface of said plate after said plug has been inserted within said opening of said plate and said snap-fastener blade means has been snap-fitted within said opening of said plate.

13. A plug according to claim 12 wherein said snap-fastener blade has a projecting area of increased thickness to form said insertion ramp and said lip.

14. The plug as set forth in claim 13, wherein:
said increased thickness area of said snap-fastener blade has a wedge-shaped configuration.

15. The plug as set forth in claim 12, wherein:
the distance defined between said attachment end of said blade means and said free end portion of said blade means is greater than the distance defined between said peripheral portion of said body portion and said insertion ramp of said blade means.

16. The plug as set forth in claim 1, wherein:
a top surface portion of said body portion has a circular bead portion formed thereon for enabling manipulation of said plug by automatic means in order to insert said plug within said plate.

17. In combination, a plug and plate assembly comprising:
a plate having an opening defined herein wherein said opening is defined within said plate by means of a continuous, non-interrupted annular sidewall portion of said plate; and
a plug to be fixedly inserted within said opening defined within said plate;
said plug comprising a body portion; and annular flanged peripheral portion defied about said body portion so as to extend in a circumferential direction about said body portion; hot melt adhesive mean disposed upon an undersurface portion of said annular flanged peripheral portion of said body portion for engaging a a first surface of said plate when said plug is inserted within said opening of said plate; and at least one snap-fastener blade means for snap-engaging a second surface of said plate when said plug is inserted within said opening of said plate, said at least one snap-fastener blade means being flexibly secured to said body portion in a cantilevered manner by means of an attachment end fixed to said body portion at a first peripheral location in said circumferential direction, and having a free end portion thereof extending in a longitudinal direction of said blade meanwhich is disposed parallel to said annular flanged peripheral portion and which is located at a second peripheral location which is remote from said first peripheral location along said circumferential direction.

18. The assembly as set forth in claim 17, wherein:
said snap-fastener blade means comprises an insertion ramp for engaging an edge portion of said annular sidewall portion of said plate defining said opening within said plate in order to facilitate insertion of said plug within said opening of said plate, and a retaining lip for engaging said second surface of said plate after said plug has been inserted within said opening of said plate and said snap-fastener blade means has been snap-fitted within said opening of said plate.

19. The assembly as set forth in claim 17, wherein:
said opening defined within said plate has a substantially oblong configuration for accommodating said body portion of said plug which has a similar oblong configuration, said at least one snap-fastener blade means comprising a pair of snap-fastener blade means disposed upon opposite rectilinear portion of said oblong configurated body portion.

20. The assembly as set forth in claim 17, wherein:
said opening defined within said plate has a substantially circular configuration for accommodating said body portion of said plug which has a similar circular configuration, said at least one snap-fastener blade means comprising three snap-fastener blade means equiangularly disposed about said body portion of said plug.

* * * * *